(12) United States Patent
Campagnolo

(10) Patent No.: US 6,474,746 B2
(45) Date of Patent: Nov. 5, 2002

(54) BICYCLE WHEEL RIM

(75) Inventor: Valentino Campagnolo, Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 09/793,107

(22) Filed: Feb. 27, 2001

(65) Prior Publication Data

US 2001/0019222 A1 Sep. 6, 2001

(30) Foreign Application Priority Data

Mar. 3, 2000 (IT) ........................................ TO200A0205

(51) Int. Cl.⁷ ................................................ B60B 1/02
(52) U.S. Cl. ............................................ 301/58; 301/55
(58) Field of Search ............................ 301/58, 67, 68, 301/69, 70, 95.101, 95.104, 56, 57, 59, 60, 55

(56) References Cited

U.S. PATENT DOCUMENTS

| | | | | |
|---|---|---|---|---|
| 149,213 A | * | 3/1874 | Cease | 301/58 |
| 365,091 A | * | 6/1887 | Owen | 301/58 |
| 376,969 A | * | 1/1888 | Schneidewind | 301/58 |
| 528,887 A | * | 11/1894 | Myers | 301/58 |
| 582,486 A | * | 5/1897 | Rowe | 301/58 |
| 672,747 A | * | 4/1901 | Wheeler | 301/58 |
| 1,286,065 A | * | 11/1918 | Murray | 301/58 |
| 4,626,036 A | * | 12/1986 | Hinsberg et al. | 301/58 |
| 6,070,948 A | * | 6/2000 | Chen | 301/58 |
| 6,145,936 A | * | 11/2000 | Alberti et al. | 301/58 |
| 6,145,937 A | * | 11/2000 | Chen | 301/58 |

FOREIGN PATENT DOCUMENTS

| | | |
|---|---|---|
| EP | 0 916 520 A2 | 5/1999 |
| FR | 2 745 232 A1 | 8/1997 |
| NL | 96 981 C | 1/1961 |
| NL | 262 739 A | 5/1964 |
| NL | 266 441 A | 7/1964 |

\* cited by examiner

Primary Examiner—S. Joseph Morano
Assistant Examiner—Long Bae Nguyen
(74) Attorney, Agent, or Firm—Sughrue Mion, PLLC

(57) ABSTRACT

A rim for a spoked bicycle wheel having a tubeless tire comprises a continuous outer circumferential wall without any holes or openings, and a plurality of supports for nipples for tightening the spokes, the said supports supporting the nipples outside the section making up the rim.

13 Claims, 3 Drawing Sheets

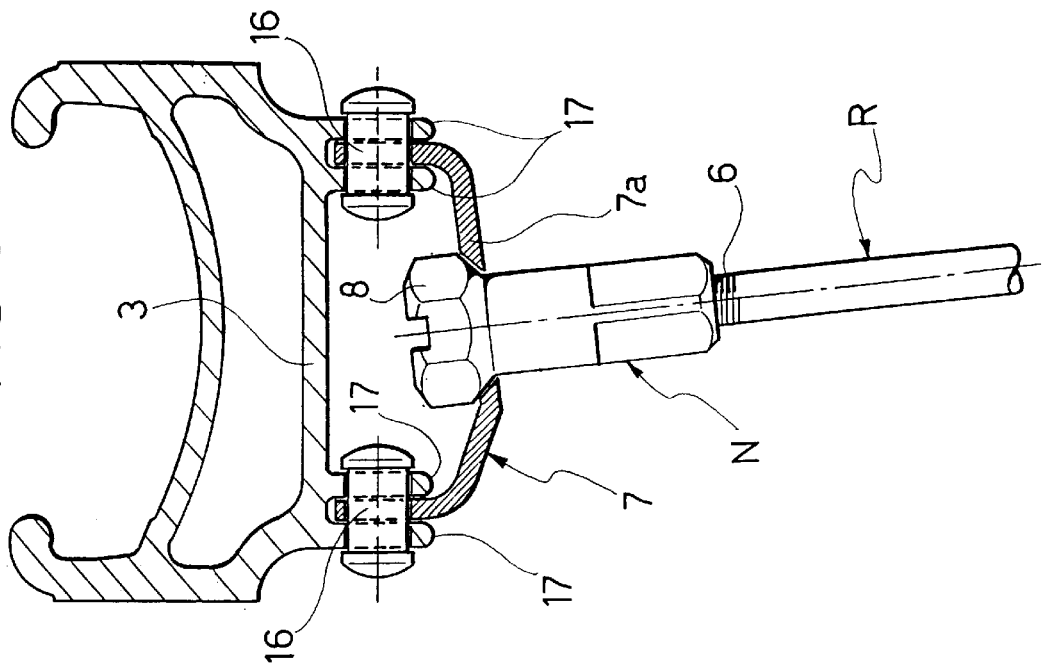
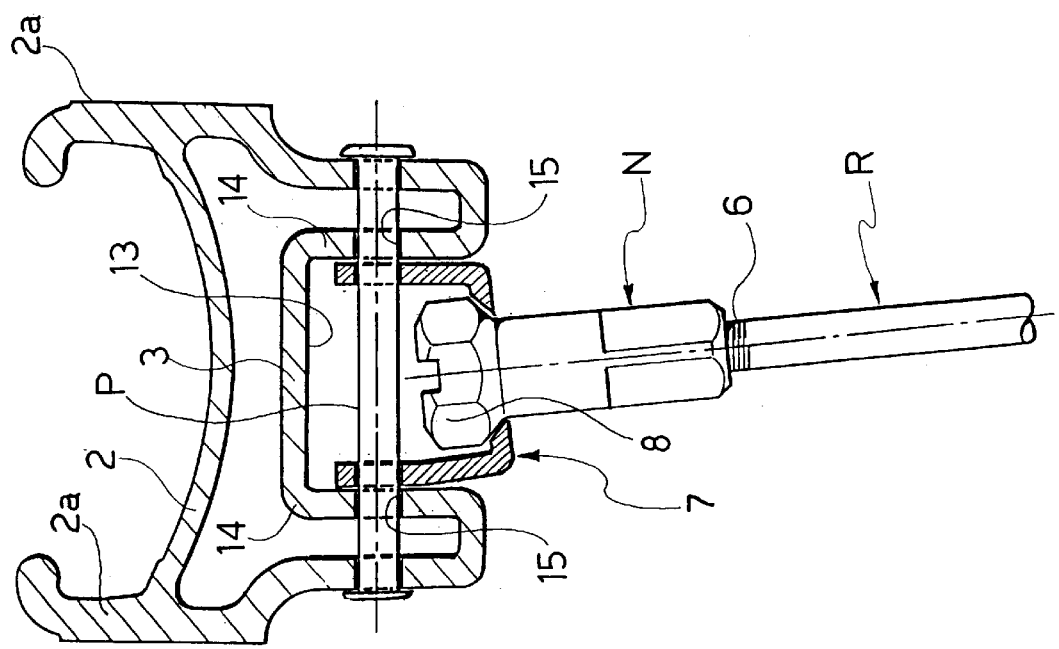

BICYCLE WHEEL RIM

The present invention relates to spoked bicycle wheels of the type made of section comprising:

an outer circumferential wall and an inner circumferential wall, connected to each other by two side walls; and means for supporting a plurality of nuts or nipples for tightening the wheel spokes, each nipple being designed to be screwed on a threaded end portion of a respective spoke.

According to the prior art, the inner circumferential wall of the rim has a plurality of holes, each having an edge that acts as a supporting seat for supporting the head of a respective nipple which is inserted into the hole and is screwed onto the threaded end of the respective spoke. The head of the nipple is therefore set in the internal space of the rim comprised between the outer circumferential wall and the inner circumferential wall. In the aforesaid known solution, the outer circumferential wall of the rim has a plurality of openings for insertion of the nipples, as well as for insertion of the tool for tightening the nipples.

More recently, however, the need has been felt for making spoked bicycle wheels with tubeless tires. In this case, the known solution described above is not usable in so far as the holes arranged on the outer circumferential wall of the rim would not enable air tightness of the chamber of the tire, which is under pressure, the said chamber being defined directly between the outer circumferential wall of the rim and the wall of the tire itself.

The purpose of the present invention is therefore to make a rim of the type referred to at the beginning of the present description that will, however, be usable also with a tubeless tire.

With a view to achieving the above purpose, the subject of the invention is a rim of the type specified above, characterized in that the aforesaid means for supporting the nipples comprise a plurality of nipple supports connected to the rim and arranged outside the section that forms the rim, each of the said nipple supports having a seat for supporting a respective nipple at least partially outside the section that forms the rim.

Thanks to the above characteristics, the rim according to the invention enables adoption of a tubeless tire in that the outer circumferential wall of the rim is without holes or openings, and is therefore perfectly airtight, whilst the nipples for tightening the spokes can be manoeuvred easily with any appropriate manoeuvring tool since they are arranged outside the section that forms the rim.

Again in accordance with the invention, each nipple support supports the respective nipple in a position that is at a slight distance from the inner circumferential wall of the rim in the direction of the axis of the rim. Preferably, each nipple support is made up of a bridge-type bracket which is set substantially in a radial plane containing the axis of the rim and has two opposite ends connected to the rim and a central part having an opening the edge of which functions as a supporting seat for the head of a respective nipple designed to be inserted into said opening.

According to a preferred embodiment, the edge of the opening provided in each nipple support is designed to co-operate with a corresponding surface of the head of the respective nipple in such a way as to leave the nipple the possibility of being oriented with its axis at least in a plane containing the axis of the rim. In addition, in the above-mentioned preferred embodiment each nipple support is connected to the rim in an articulated way about an axis that is substantially parallel to the axis of the rim.

Thanks to the aforementioned characteristics, when each nipple is assembled it can be readily adapted to the orientation that the respective spoke must assume with respect to the rim.

In one example of embodiment, the ends of the bridge-type bracket that makes up each nipple support are mounted on a pivot connected to the rim. This pivot is set so that it passes through two holes facing one another made in the two side walls of the rim in a radially more internal position with respect to the outer circumferential wall of the rim. Each pivot has its ends protruding outside of the side walls of the rim, and the respective nipple support has its ends articulated on said protruding ends of the pivot.

In an alternative embodiment, the inner circumferential wall of the rim has a circumferential groove or channel having two side walls, and each pivot of the nipple supports traverses also two holes set facing one another made in said side walls of said channel, the ends of the bracket that each forms a nipple support being articulated on the portion of the respective pivot that is set within said channel.

Again according to a further embodiment, the ends of the bridge-type bracket forming each nipple support are articulated by means of respective pivots to respective annular flanges protruding from the inner circumferential wall of the rim.

The way in which the articulation of each nipple support to the rim is obtained in accordance with the invention may, however, be different from the ones mentioned above by way of example.

Again in the case of the preferred embodiment of the invention, the bracket forming each nipple support has an asymmetrical configuration, with the central part of the bracket being inclined with respect to a direction parallel to the axis of the rim in such a way that the respective nipple is supported by said bracket, with its axis forming a camber angle with respect to the median plane orthogonal to the axis of the rim. The nipple supports are mounted on the rim in such a way as to form the aforesaid camber angle alternately on one side and on the other side of the median plane of the rim, it of course being possible to choose a different camber angle on each side and a camber angle different for the front wheel than the one for the rear wheel.

In the rim according to the invention, each nipple may be manoeuvred easily, since it is set outside the rim, by means of any suitable tool or wrench designed to engage on one side a portion of the nipple. For this purpose, the nipple has, in a way of itself known, a portion with a section shaped for engagement of the wrench.

The rim according to the invention thus enables assembly and tensioning of the spokes in a way similar to that adopted according to traditional techniques, even though the rim may have a continuous outer wall without any holes or openings.

The invention obviously relates both to the rim described above and to a bicycle wheel using said rim. Of course, the invention is suitable for making both front bicycle wheels and rear bicycle wheels since in the two cases the only difference lies in the number and arrangement of the spokes. On the other hand, as has been seen, the rim according to the invention enables each nipple to be oriented both in a plane containing the axis of the rim, thanks to the orientable support for the head of the nipple on the nipple-supporting bracket, and in a plane perpendicular to the axis of the rim, thanks to the articulated connection of the nipple-supporting bracket to the rim.

Further characteristics and advantages of the invention will emerge from the ensuing description with reference to the annexed drawings, which are provided purely by way of non-limiting examples and in which:

FIGS. 3–5 illustrate three variants of FIG. 2.

Figure 1:
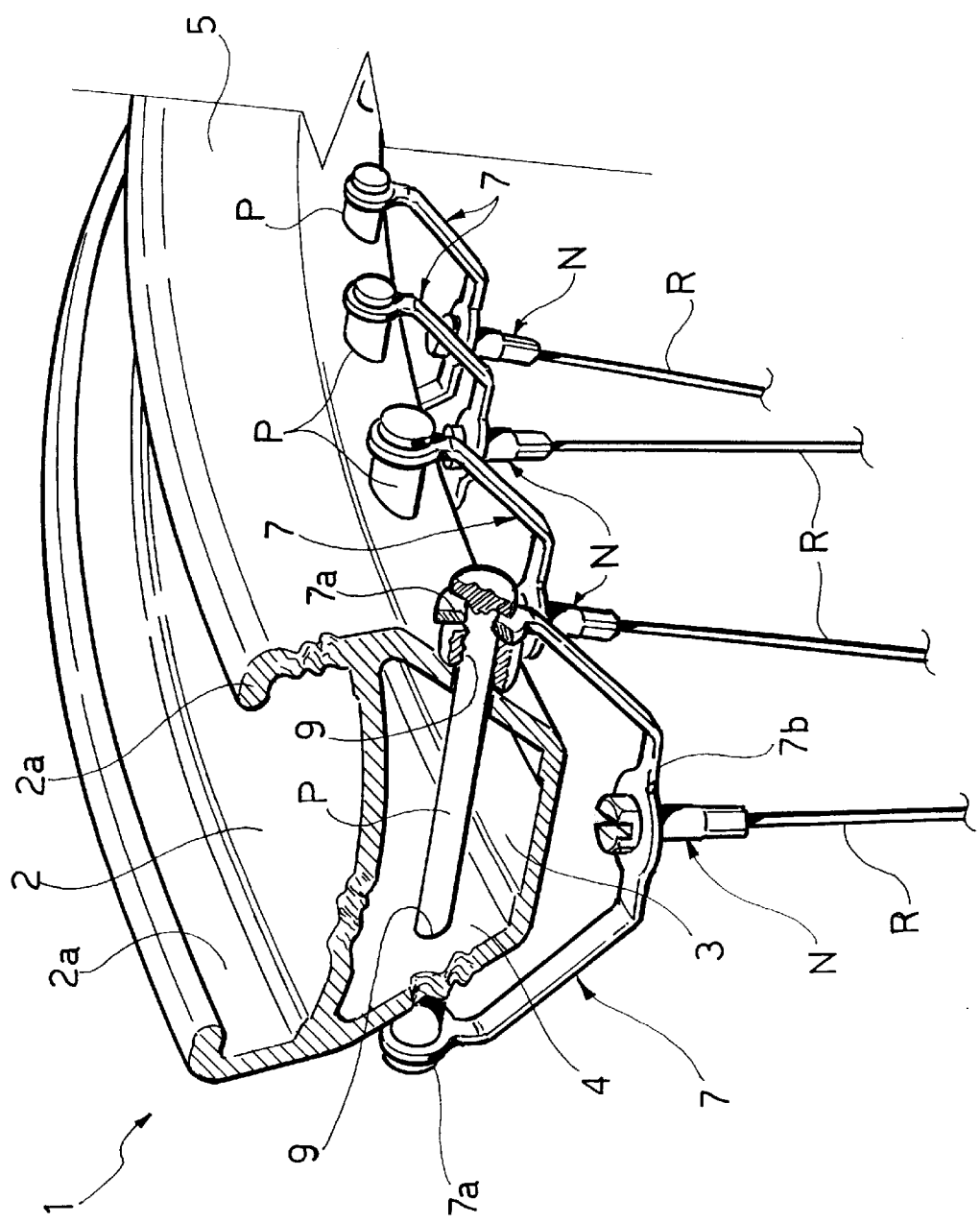
FIG. 1 is a partial and sectional perspective view of a first embodiment of a rim and of a wheel according to the invention.

In the drawings, the reference number 1 designates, as a whole, a rim according to the invention. The rim may consist, in a way in itself known, of extruded section made of light alloy, but it is clear that the present invention is of general applicability, irrespective of the material and of the technology with which the rim is made.

The rim 1 comprises an outer circumferential wall 2, an inner circumferential wall 3, and two side walls 4, 5 which connect the two circumferential walls 2, 3 together. The wall 2 moreover has two annular flanges 2a which protrude radially towards the outside and are designed to be used in a way of itself known for anchoring the tire.

As may be seen in FIG. 1, the outer circumferential wall 2 is a continuous wall without any holes or openings, which means that the rim according to the invention is suitable for being used also with a tubeless tire, even though the use of the rim according to the invention with a traditional tire with inner tube is of course not ruled out.

As may be clearly seen again in FIG. 1, the rim according to the invention enables assembly and tensioning of a plurality of spokes R in the traditional way, i.e., by screwing a nut or nipple N on a threaded end portion 6 (see FIG. 2) of the spoke R. This is made possible in so far as the nipples N are supported on the outside of the rim 1 by a plurality of nipple supports 7 which are connected to the rim 1.

Figure 2:
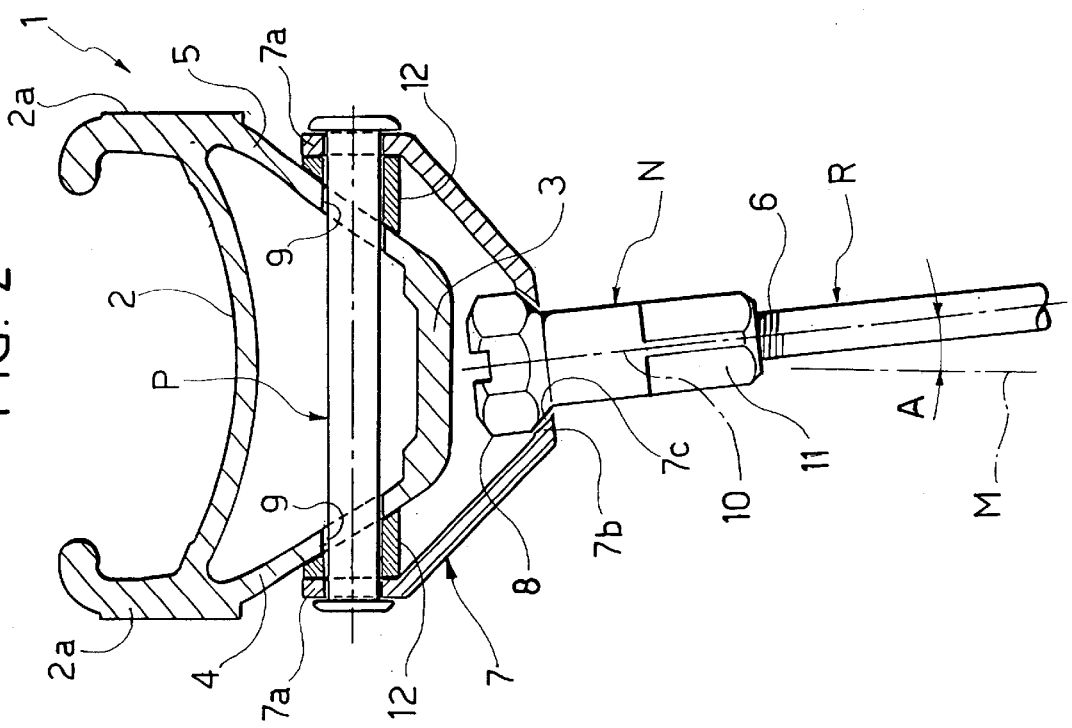
FIG. 2 is a sectional view of a detail of FIG. 1.

In the preferred embodiment illustrated in FIGS. 1 and 2, each nipple support 7 consists of a bridge-type bracket comprising two ends 7a connected to the rim 1, and a central part 7b with a hole 7c, the edge of which functions as a supporting seat for the head 8 of the nipple N, which is inserted in the hole 7c.

As may be seen in the drawings, the ends 7a of the bracket 7 forming each nipple support are mounted in an articulated way on the ends of a pivot P which is inserted in two holes 9 facing one another made in the side walls 4, 5 in a radially more internal position with respect to the wall 2. The pivot P has its ends protruding from the two side walls 4, 5 to receive on them in an articulated way the ends 7a of the bracket 7 forming the respective nipple support. In the case of the example illustrated in FIG. 2, each pivot P has end heads rivetted (upset) against the ends 7a of the bracket 7 for withholding the pivot in its axial direction.

The articulated connection of each bracket 7 to the rim 1 by means of the respective pivot P makes it possible to orient the axis of the nipple about the axis of the pivot. At the same time, the hole 7c which receives the head 8 of the nipple N is made in a portion of the bracket 7 which can be shaped (drawn) so as to have a conical or spherical conformation similar to the conformation of the corresponding surface of the head 8 to enable orientation of the axis of the nipple N at least in a radial plane containing the axis of the rim. In this way, when the spokes are assembled and tensioned, the nipple-supporting bracket 7 enables the respective nipples to be oriented so as to be aligned (parallel) to the respective spokes; consequently, the spokes do not need to be bent to be inserted in the respective nipples.

In addition, as emerges clearly from FIG. 2, each bracket 7 has an asymmetrical configuration, with the central part 7b being oriented according to a direction inclined with respect to a direction parallel to the axis of the rim, in such a way that the axis of the nipple N, designated by 10, forms a camber angle A with respect to the median vertical plane M of the rim. In addition, the nipple N has, in a way of itself known, a portion 11 having a shaped section, for instance a square or hexagonal section, to be engaged on one side by a wrench which enables the nipple N to be tightened easily on a respective spoke R.

As may be seen, the rim according to the invention enables assembly of a tubeless tire in so far as the outer circumferential wall 2 can be without openings that are traditionally provided in rims of the known art in order to enable insertion of the nipples and access to a manoeuvring tool for tightening the nipples. Of course, the invention is also applicable to a traditional rim for a tire with inner tube.

Figure 3:
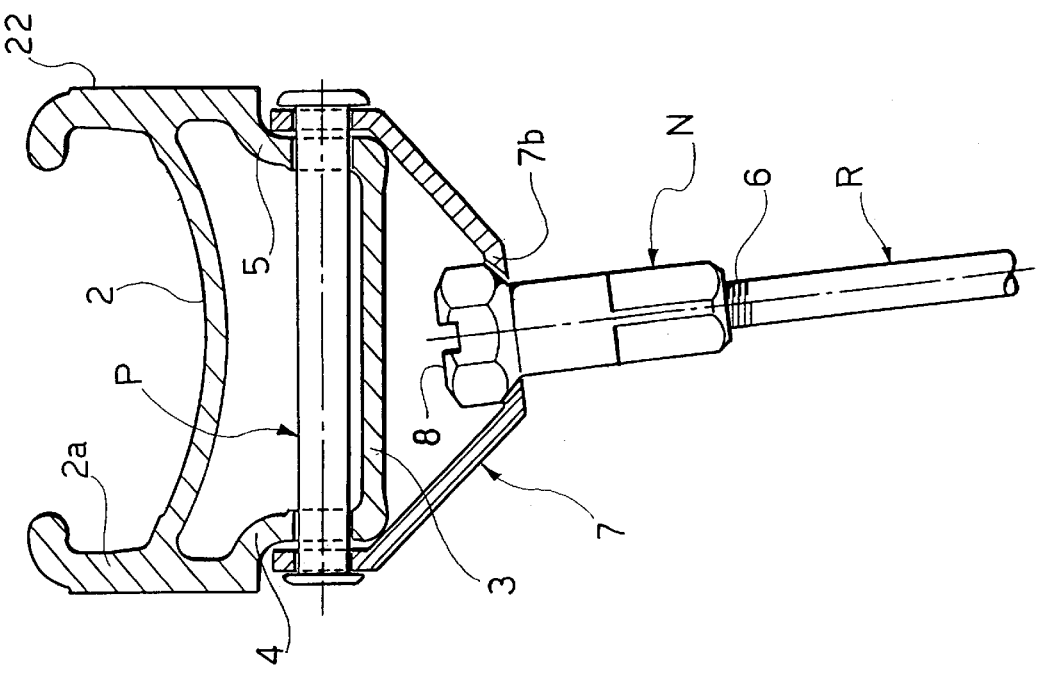

In the case of FIG. 2, the side walls 4, 5 of the rim converge towards the centre of the rim, so that two spacer bushings 12 are provided between the ends of each bracket 7 and the side walls 4, 5 of the rim, each bushing 12 having an inclined end surface co-operating with the adjacent inclined side of the rim. FIG. 3 illustrates the same solution in the case of a rim having side walls 4, 5 that are parallel to one another.

Of course, the brackets 7 are mounted on the rim in such a way as to form the aforesaid camber angle A alternately on one side or on the other side of the rim (as may be seen in FIG. 1).

FIG. 4 illustrates yet another variant, in which the inner circumferential wall 3 of the rim has a circumferential groove or channel 13 with side walls 14 that also have holes 15 facing one another which are also traversed by the pivot P. In this case, the bracket 7 forming each nipple support is mounted in an articulated way on the portion of the pivot P that is set inside the channel 13.

Finally, FIG. 5 illustrates a further variant, in which the ends 7a of each bracket 7 are articulated by means of respective pivots 16 to annular flanges 17 protruding radially inwards from the inner circumferential wall 3 of the rim.

As emerges clearly from the foregoing description, the principle lying at the basis of the present invention is that of providing means of support for the nipples N which are shaped and arranged in such a way as to support the nipples N outside the section forming the rim, preferably with the possibility of orienting the axis of each nipple both in a plane containing the axis of the rim and in a plane perpendicular to the axis of the rim.

Of course, without prejudice to the principle of the invention, the details of construction and the embodiments may vary widely with respect to what is described and illustrated herein purely by way of example, without thereby departing from the scope of the present invention. For instance, the conformation of the cross section of the rim may be any whatsoever, and in particular may be either symmetrical or asymmetrical.

What is claimed is:

1. A rim for a spoked bicycle wheel, made of section comprising:

an outer circumferential wall and an inner circumferential wall, connected to each other by two side walls; and means for supporting a plurality of nuts or nipples for tightening the wheel spokes, each nipple being designed to be screwed on a threaded end portion of a respective spoke, wherein said means comprise a plurality of nipple supports connected to the rim and arranged outside the section that forms the rim, each of the said nipple supports having a seat for supporting a respective nipple at least partially outside the section that forms the rim, and wherein each nipple support consists of a bridge-type bracket which is set substantially in a radial plane containing the axis of the rim and has two opposite ends connected to the rim and a central part having an opening the edge of which functions as a supporting seat for the head of a respective nipple designed to be inserted into said opening.

2. A rim according to claim 1, wherein the opening provided in each nipple support is made in a shaped part designed to co-operate with a corresponding surface of the head of the respective nipple in such a way as to leave the nipple the possibility of being oriented with its axis at least in a plane containing the axis of the rim.

3. A rim according to claim 1, wherein each nipple support is connected to the rim in an articulated way about an axis that is parallel to the axis of the rim.

4. A rim according to claim 3, wherein the ends of each bridge-type bracket forming the nipple support are mounted on a pivot connected to the rim.

5. A rim according to claim 4, wherein the pivot is set so that it passes through two holes facing one another made in the two side walls of the rim in a radially more internal position with respect to the outer circumferential wall of the rim.

6. A rim according to claim 5, wherein each pivot has its ends protruding outside of the side walls of the rim, and the respective nipple support has its ends articulated on said protruding ends of the pivot.

7. A rim according to claim 6, wherein mounted on each end of the pivot is a spacer bushing set between the respective end of the nipple support and the side of the rim facing said end.

8. A rim according to claim 5, wherein the inner circumferential wall of the rim has a circumferential groove or channel with two side walls, in that each pivot of the nipple support also passes through two holes facing one another which are made in said side walls of said channel, and in that the ends of the bracket forming each nipple support are articulated on the portion of the respective pivot that is set inside said channel.

9. A rim according to claim 3, wherein the ends of the bridge-type bracket forming each nipple support are articulated by means of respective pivots to respective annular flanges protruding from the inner circumferential wall of the rim.

10. A rim according to claim 1, wherein the bracket forming each nipple support has an asymmetrical configuration, with the central part of the bracket being inclined with respect to a direction parallel to the axis of the rim in such a way that the respective nipple is supported by said bracket with its axis forming a camber angle with respect to the median plane orthogonal to the axis of the rim.

11. A rim according to claim 10, wherein the nipple supports are mounted on the rim in such a way as to form the above-mentioned camber angle alternately on one side and on the other side of the median plane of the rim.

12. A rim for a spoked bicycle wheel, made of section comprising:

an outer circumferential wall and an inner circumferential wall, connected to each other by two side walls; and means for supporting a plurality of nuts or nipples for tightening the wheel spokes, each nipple being designed to be screwed on a threaded end portion of a respective spoke, wherein said means comprise a plurality of nipple supports connected to the rim and arranged outside the section that forms the rim, each of the said nipple supports having a seat for supporting a respective nipple at least partially outside the section that forms the rim, and wherein each nipple support supports the respective nipple in a position set at a slight distance from the inner circumferential wall of the rim, in the direction of the axis of the rim.

13. A spoked bicycle wheel according to claim 12, comprising a rim according to any one of the preceding claims.

* * * * *